United States Patent
Hayes et al.

(10) Patent No.: US 11,628,703 B2
(45) Date of Patent: Apr. 18, 2023

(54) COMPACT DUAL-ZONE CONSOLE HVAC SYSTEM FOR AUTOMOBILES

(71) Applicant: Ford Global Technologies, LLC, Dearborn, MI (US)

(72) Inventors: Robert Louis Hayes, Dearborn, MI (US); John Azar, LaSalle (CA); Trent Greear Sutherland, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 318 days.

(21) Appl. No.: 16/595,856

(22) Filed: Oct. 8, 2019

(65) Prior Publication Data

US 2021/0101438 A1    Apr. 8, 2021

(51) Int. Cl.
  *B60H 1/00* (2006.01)
(52) U.S. Cl.
  CPC ..... *B60H 1/00064* (2013.01); *B60H 1/00485* (2013.01); *B60H 1/00564* (2013.01); *B60H 2001/002* (2013.01); *B60H 2001/0015* (2013.01); *B60H 2001/00192* (2013.01)
(58) Field of Classification Search
  CPC ........... B60H 2001/00128; B60H 2001/00135; B60H 2001/00192; B60H 2001/002; B60H 2001/00214; B60H 2001/00221; B60H 2001/00228; B60H 2001/00242; B60H 1/323; B60H 1/00557; B60H 1/00564; B60H 1/26; B60H 1/244; B60H 1/246; B60H 1/00042; B60H 1/00614; B60H 1/00242; B60H 1/00135
  See application file for complete search history.

(56) References Cited

U.S. PATENT DOCUMENTS

| | | | |
|---|---|---|---|
| 3,908,751 A | 9/1975 | Sheppard, Jr. |
| 4,361,170 A | 11/1982 | Peloza |
| 4,482,009 A | 11/1984 | Nishimura et al. |
| 5,142,881 A | 9/1992 | Nagayama |
| 5,329,970 A | 7/1994 | Squirrell |
| 5,394,860 A | 3/1995 | Borie |
| 5,794,845 A | 8/1998 | Ito et al. |

(Continued)

FOREIGN PATENT DOCUMENTS

| EP | 1205321 A2 | 5/2002 |
|---|---|---|
| JP | 2006226649 A | 8/2006 |

(Continued)

OTHER PUBLICATIONS

All-Electric Vehicles—DOE (Oct. 18, 2012) (Year: 2012).*
Hybrid Electric Vehicles—DOE (Oct. 14, 2012) (Year: 2012).*
Plug-In Hybrid Electric Vehicles—DOE (Oct. 17, 2012) (Year: 2012).*
JP2008293853A English Machine Translation (Year: 2008).*

(Continued)

*Primary Examiner* — Jenna M Hopkins
(74) *Attorney, Agent, or Firm* — Vichit Chea; Price Heneveld LLP (57) ABSTRACT

A multi-zone climate control system for vehicles includes a front HVAC unit, a powered blower, and a heater core. The front HVAC unit is adapted to condition air provided to first and second front zones. The front HVAC unit further includes a cold air outlet connected to the powered blower. Cold air from the cold air outlet of the front HVAC unit passes through the powered blower and enters the heater core. The heater core is configured to control a temperature of conditioned air supplied to at least one rear zone of the passenger compartment.

20 Claims, 8 Drawing Sheets

(56) References Cited

U.S. PATENT DOCUMENTS

| | | | |
|---|---|---|---|
| 5,902,181 A | 5/1999 | Bain | |
| 6,206,092 B1 * | 3/2001 | Beck | B60H 1/00064 165/203 |
| 6,415,851 B1 | 7/2002 | Hall et al. | |
| 6,491,578 B2 | 12/2002 | Yoshinori et al. | |
| 6,959,754 B2 | 11/2005 | Lee et al. | |
| 8,997,837 B2 * | 4/2015 | Kakizaki | B60H 1/3233 165/42 |
| 9,248,719 B2 | 2/2016 | Kang et al. | |
| 10,272,744 B2 | 4/2019 | Sawyer et al. | |
| 2005/0257925 A1 * | 11/2005 | Koukouravas | B60H 1/00664 165/42 |
| 2007/0137833 A1 | 6/2007 | Kang et al. | |
| 2009/0007978 A1 | 1/2009 | Alston et al. | |
| 2009/0038774 A1 * | 2/2009 | Ogiso | B60H 1/245 165/42 |
| 2017/0066304 A1 | 3/2017 | Sawyer et al. | |
| 2018/0105011 A1 * | 4/2018 | Park | B60H 1/00514 |
| 2019/0077286 A1 | 3/2019 | Filipkowski et al. | |
| 2020/0215872 A1 * | 7/2020 | Han | B60H 1/00064 |

FOREIGN PATENT DOCUMENTS

| | | | |
|---|---|---|---|
| JP | 2008293853 A | * | 12/2008 |
| JP | 2008293853 A | | 12/2008 |

OTHER PUBLICATIONS

Non-Final Office Action dated Apr. 14, 2021, in U.S. Appl. No. 16/595,874, filed Oct. 8, 2019, entitled Modular Climate System Enabling Flexible Multi-Zone Temperature and Mode Control in Automotive HVAC Systems, 59 pages.

US Duct—Heavy Duty Butterfly, "The Complete Duct Source," at least as early as Jul. 28, 2018 (1 page).

Final Office Action dated Jan. 7, 2021, in U.S. Appl. No. 16/360,773, filed Mar. 21, 2019, entitled Dual Zone Auxiliary Climate Control System for a Vehicle, 25 pages.

Non-Final Office Action dated Mar. 21, 2019, in U.S. Appl. No. 16/360,773, filed Mar. 21, 2019, entitled Dual Zone Auxiliary Climate Control System for a Vehicle, 20 pages.

* cited by examiner

COMPACT DUAL-ZONE CONSOLE HVAC SYSTEM FOR AUTOMOBILES

FIELD OF THE INVENTION

The present invention generally relates to HVAC systems for motor vehicles, and in particular, to a compact HVAC system configured to provide conditioned (heated and cooled) air to multiple zones of a vehicle interior space.

BACKGROUND OF THE INVENTION

Various types of heating ventilation and air conditioning ("HVAC") systems have been developed for motor vehicles. Known systems may utilize coolant that has been heated by an internal combustion engine to heat air that is supplied to the passenger compartment. Vehicle HVAC systems may also include air conditioning systems to cool and/or dehumidify air that is supplied to the vehicle interior space.

SUMMARY OF THE INVENTION

One aspect of the present disclosure is a vehicle having a passenger compartment and left and right front seats defining first and second front zones of the passenger compartment. The vehicle includes a second row of seats defining at least one rear zone of the passenger compartment. The vehicle further includes a center portion extending fore-aft and a console disposed in the center portion. A portion of the console may be disposed between the left and right front seats. The vehicle may comprise an electrically-powered vehicle, and the vehicle may include a battery (e.g., a high voltage traction battery) disposed below at least a portion of the center console. The vehicle further includes a multi-zone climate control system including a front HVAC unit, a powered blower, and a heater core. The HVAC unit preferably comprises a front HVAC unit that is mounted in a forward portion of the vehicle that is generally forward of (in front of) the left and right front seats. The front HVAC unit is adapted to selectively heat and cool air, and the front HVAC unit includes left and right air outlets that are configured to provide conditioned (heated and cooled) air having non-equal first and second temperatures to the first and second front zones, respectively. The front HVAC unit further includes a cold air outlet. The front HVAC unit is configured to provide cold air to the cold air outlet. The front HVAC unit may be configured such that only cold air or ambient air can be supplied to the cold air outlet. Thus, the front HVAC unit may optionally be configured such that it is incapable of providing heated air to the cold air outlet. The powered blower is fluidly connected to the cold air outlet, and the powered blower is generally positioned in the center portion. The powered blower may be positioned between the first and second front zones. The heater core is fluidly connected to the powered blower whereby cold air from the cold air outlet of the front HVAC unit passes through the powered blower and enters the heater core. The heater core includes a liquid-to-air heat exchanger that is fluidly connected to a source of heated liquid to selectively heat cold air entering the heater core if required. The heater core includes a heat control system that is configured to control (e.g., raise or lower) a temperature of air exiting the heater core. The heat control system comprises at least 1) a liquid-based heat control that is configured to adjust at least one of a temperature and a volume flow rate of heated liquid flowing through the liquid-to-air heat exchanger, and 2) an air blender having a blend door that is configured to selectively mix cold air from the front HVAC unit with air that has been heated by the liquid-to-air heat exchanger to control the temperature of air exiting the heater core. The heater core further includes at least one air outlet that is configured to supply conditioned air from the heater core to at least one rear zone of the passenger compartment.

Embodiments of the first aspect of the disclosure can include any one or a combination of the following features:

Cold air from the HVAC unit may be supplied to the rear zone without further cooling of the air after it exits the front HVAC unit.

The multi-zone climate control system may include at least one mode door operably connected to the heater core to control the flow of air from the at least one air outlet to at least one panel outlet of the at least one rear zone and at least one floor outlet of the at least one rear zone.

The heater core may be positioned in the center console rearward of the powered blower.

The electrically-powered vehicle may include a powertrain compartment in front of the passenger compartment, and may include an electrically-powered Positive Thermal Coefficient (PTC) heater disposed in or adjacent the powertrain compartment.

The PTC heater may be configured to heat liquid, and the electrically-powered vehicle may include at least one fluid line fluidly connecting the PTC heater to the liquid-to-air heat exchanger of the heater core whereby heated liquid from the PTC heater is supplied to the liquid-to-air heat exchanger of the heater core.

The flow rate of liquid through the liquid-to-air heat exchanger may be adjustable to thereby adjust a temperature of air exiting the heater core.

A temperature of liquid entering the liquid-to-air heat exchanger may be adjusted to thereby adjust the temperature of air exiting the heater core.

The heater core may comprise a dual zone heater core having first and second liquid-to-air heat exchangers and corresponding first and second air outlets configured to supply heated air to third and fourth rear zones of the passenger compartment.

The flow rates of liquid flowing through the first and second liquid-to-air heat exchangers may be independently adjusted to independently control temperatures of heated air exiting the first and second air outlets.

The electrically-powered vehicle may include a dual mode door unit having first and second independently movable mode doors that are configured to mix cold air entering the dual zone heater core with heated air from the first and second air outlets to thereby independently control temperatures of air supplied to the third and fourth zones.

The electrically-powered vehicle may further include a liquid-cooled internal combustion engine that heats liquid coolant.

The electrically-powered vehicle may include at least one liquid passageway fluidly interconnecting the liquid-cooled internal combustion engine with the liquid-to-air heat exchanger of the heater core.

The front HVAC unit may be configured such that it is incapable of supplying heated air to the cold air outlet of the front HVAC unit.

The vehicle may include a cold air duct fluidly interconnecting the cold air outlet of the front HVAC unit to the powered blower.

The cold air duct, the powered blower, and the heater core may be positioned in a substantially linear row extending in a fore-aft direction in the center console.

The vehicle may include left and right footwells in front of the left and right front seats, respectively, and the vehicle may include a panel disposed in front of the front row seats above the left and right footwells.

The left and right front air outlets may include left and right panel outlets in the panel and left and right floor outlets disposed in the left and right footwells, respectively.

The front HVAC unit may be configured to supply heated and cooled air to left and right panel outlets and the left and right floor outlets.

The vehicle may include a powertrain compartment in front of the passenger compartment, and a floorboard disposed above the high voltage traction battery.

The center console may extend between the left and right footwells and between the left and right front seats.

The floorboard may extend under the center console, and the center console may form an elongated HVAC passageway directly above a central portion of the floorboard.

The cold air outlet of the front HVAC unit may be disposed at a forward end of the HVAC passageway.

The cold air outlet of the front HVAC unit may be fluidly connected to the powered blower by a cold air duct disposed in the HVAC passageway.

The powered blower and the heater core may be disposed in the HVAC passageway.

Another aspect of the present disclosure is a multi-zone climate control system for vehicles having a passenger compartment defining first and second front zones and at least one rear zone. The multi-zone climate control system includes a front HVAC unit configured to be mounted in a forward portion of a vehicle. The front HVAC unit may be configured to selectively heat and cool air that is supplied to left and right front air outlets to provide heated and cooled air to first and second zones, respectively, of a vehicle. The front HVAC unit further includes a cold air outlet that provides only cold air. The system may include a powered blower that is fluidly connected to the cold air outlet, and a heater core that is fluidly connected to the powered blower whereby cold air from the cold air outlet of the front HVAC unit passes through the powered blower and enters the heater core. The heater core includes a liquid-to-air heat exchanger that is configured to be fluidly connected to a source of heated liquid to selectively heat cold air entering the heater core. The heater core includes a control system that is configured to control a temperature of air exiting the heater core. The heat control system comprises at least one of 1) a liquid-based heat control that adjusts at least one of a temperature and a volume flow rate of heated liquid flowing through the liquid-to-air heat exchanger, and 2) an air blender having a blend door that is configured to selectively mix cold air from the front HVAC unit with air that has been heated by the liquid-to-air heat exchanger to control the temperature of air exiting the heater. The heater core further includes at least one air outlet that is configured to supply heated air from the heater core to at least one rear zone of the passenger compartment.

Another aspect of the present disclosure is a method of controlling multiple zones of a passenger compartment of a motor vehicle. The method includes utilizing a front HVAC unit to provide independently-controlled conditioned (heated and cooled) air to first and second front zones of the passenger compartment. The method further includes causing cold air from the front HVAC unit to flow rearwardly through a center console of the motor vehicle to a heater core that is disposed in the center console. A liquid-to-air heat exchanger of the heater core is used to heat the cold air from the front HVAC unit. Air that has been heated by the liquid-to-air heat exchanger is distributed to a rear zone of the passenger compartment. The rear zone is located behind the first and second front zones of the passenger compartment. The method may optionally include causing cold air exiting the front HVAC unit to be distributed to the rear zone without further cooling of the cold air after the cold air has exited the front HVAC unit.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
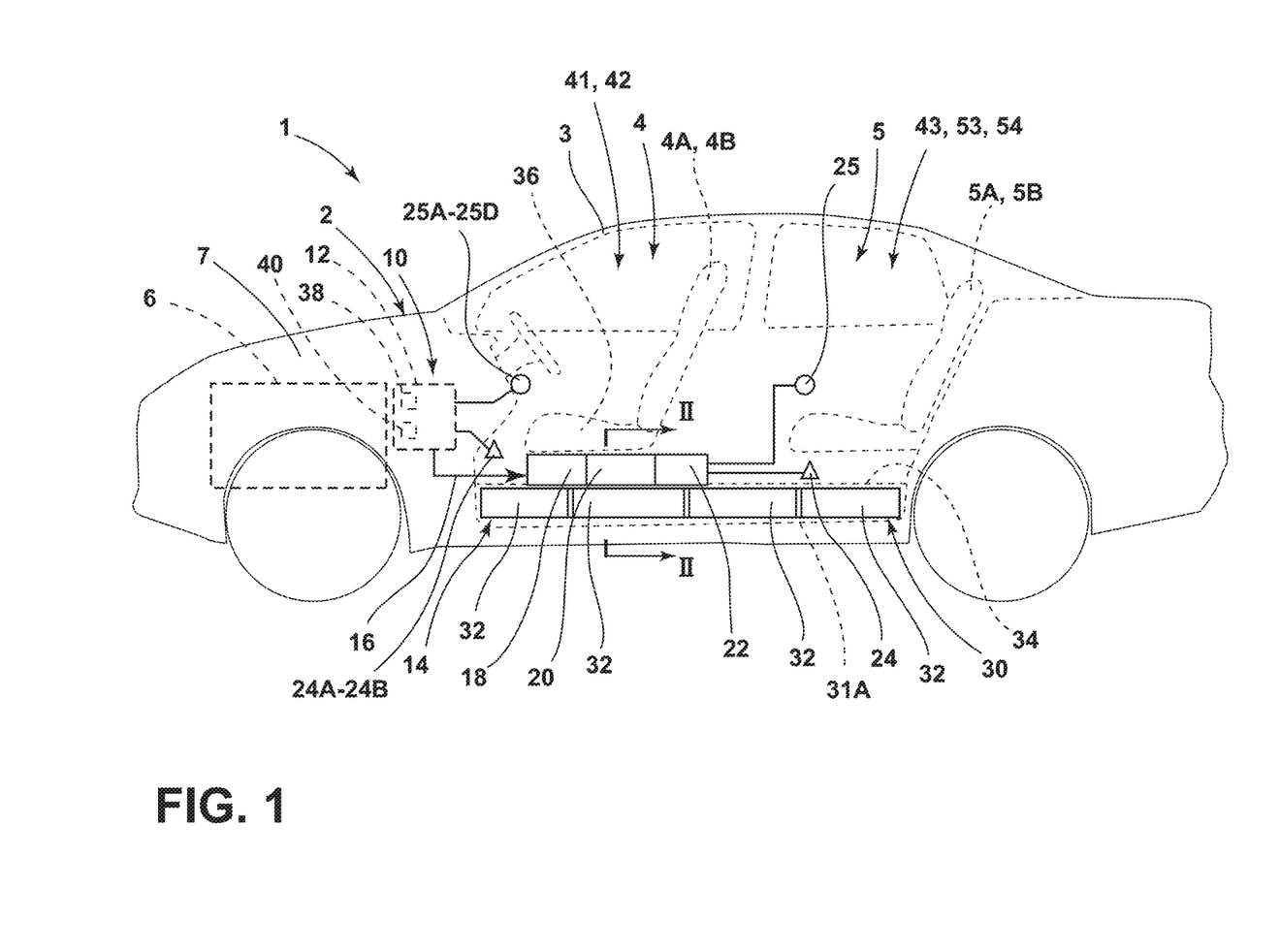
FIG. 1 is a partially schematic side elevational view of a vehicle including a dual zone climate control system according to one aspect of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present application is related to U.S. patent application Ser. No. 16/595,874 filed Oct. 8, 2019, and entitled "MODULAR CLIMATE SYSTEM ENABLING FLEXIBLE MULTI-ZONE TEMPERATURE AND MODE CONTROL IN AUTOMOTIVE HVAC SYSTEMS," the entire contents of which are incorporated herein by reference. The present application is also related to U.S. patent application Ser. No. 16/360,773, filed on Mar. 21, 2019, and entitled "DUAL ZONE AUXILIARY CLIMATE CONTROL SYSTEM FOR A VEHICLE," the entire contents of which are incorporated herein by reference.

Figure 2:
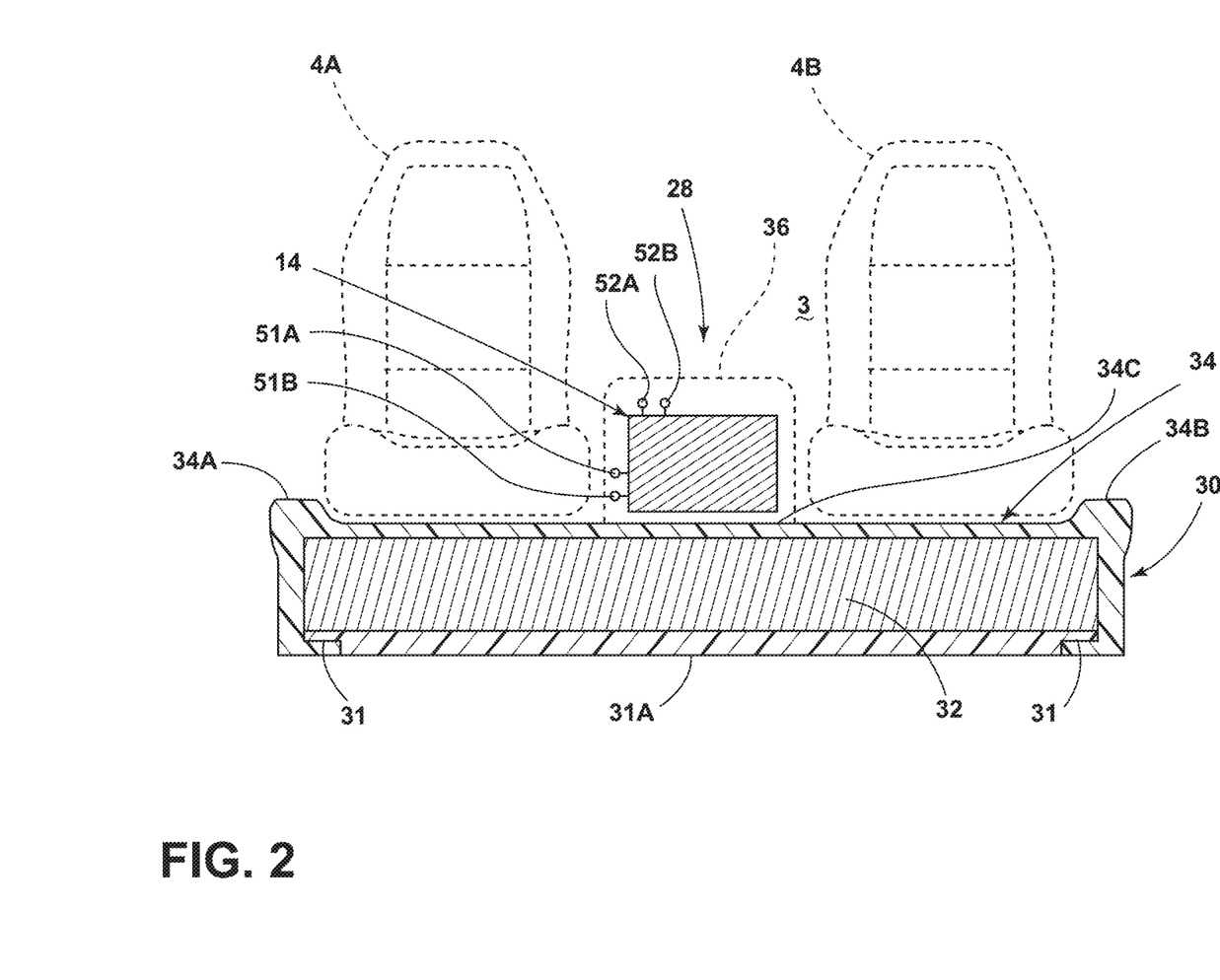
FIG. 2 is a cross-sectional view of the motor vehicle of FIG. 1 taken along the line II-II.
Figure 3:
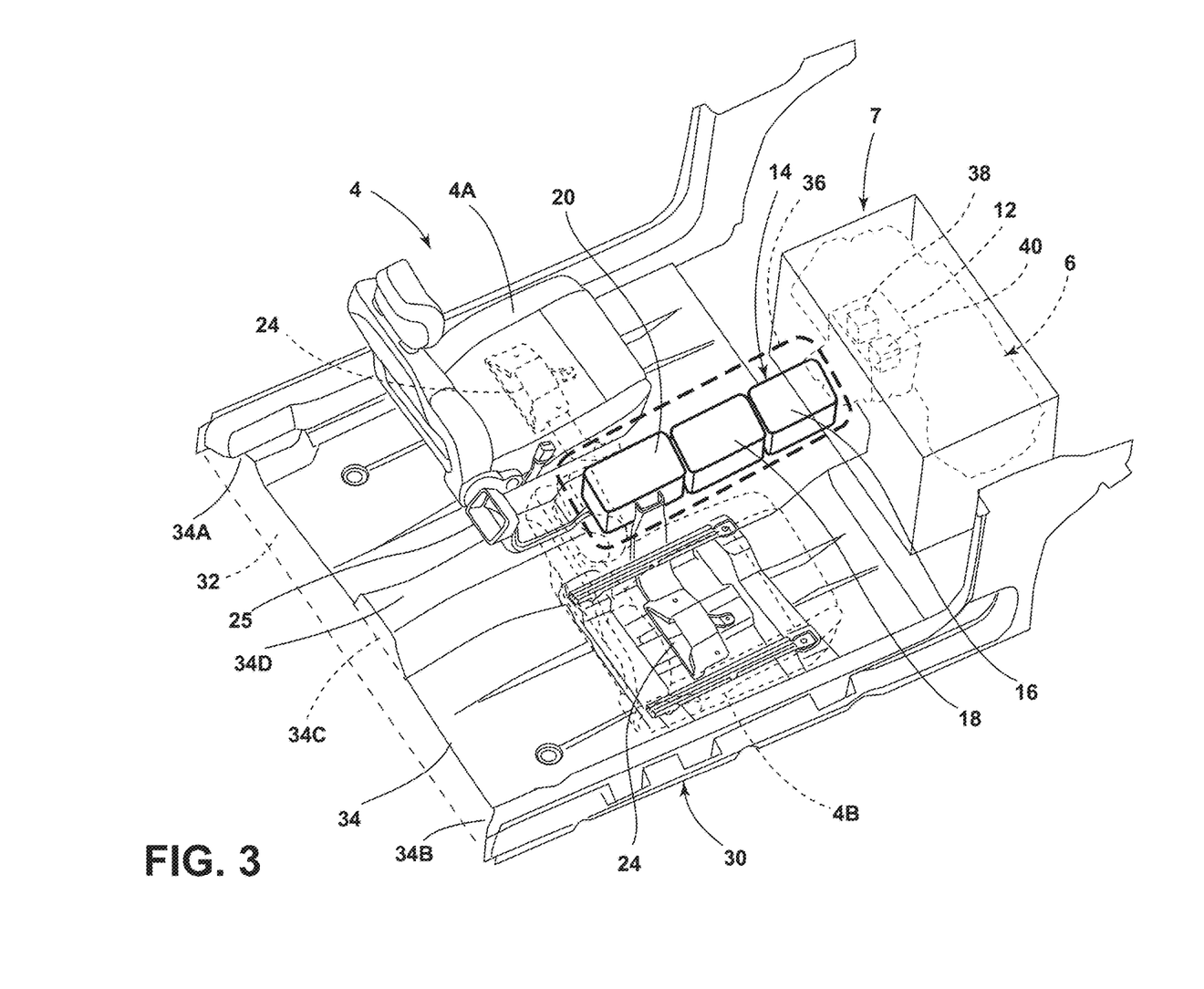
FIG. 3 is a fragmentary isometric view of a portion of the vehicle of FIG. 1.

With reference to FIGS. 1-3, a motor vehicle 1 according to one aspect of the present invention includes a body structure 2 and a passenger compartment/interior space 3. Vehicle 1 includes a front row of seats 4 including front seats 4A and 4B, and a rear row of seats 5 including rear seats 5A and 5B. Vehicle 1 further includes an engine 6 to provide for powered movement of the motor vehicle 1. Engine 6 may comprise an electric motor, an internal combustion engine, or a combination of electric and internal combustion engines (e.g., a hybrid engine system). Although engine 6 is shown schematically as a single unit in a forward portion 7 (e.g., a powertrain compartment) of vehicle 1, it will be understood that engine 6 may comprise, for example, a plurality of electric motors that are positioned in different locations of vehicle 1.

Vehicle 1 further includes a multi-zone HVAC system 10 that includes a front HVAC unit 12 that supplies conditioned air to front zones 41 and 42 corresponding to front seats 4A and 4B, respectively. As discussed in more detail below, front HVAC unit 12 may include a heating unit 38 and a cooling unit 40. Vehicle 1 further includes an auxiliary console HVAC system 14 that supplies conditioned air to a single rear zone 43 (FIG. 4) or two rear zones 53 and 54 (FIG. 5) corresponding to rear seats 5A and 5B, respectively. As discussed in more detail below, the auxiliary console HVAC system 14 receives cold air from front HVAC unit 12 via a cold air duct 16 and provides conditioned (heated and/or cooled) air to one or more zones heated rearwardly of the front row 4. An optional blower 18 causes the cold air from cold air duct 16 to flow through a heater 20, and an air distribution unit such as a mode door assembly 22 selectively directs the conditioned air to one or more lower (e.g., floor) outlets 24 and/or upper (e.g., panel) outlets 25 to thereby provide conditioned air to the rear row 5 of vehicle 1. As discussed in more detail below, the heater 20 may be turned off (deactivated) such that cold air duct 16 passes through to the floor and panel outlets 24 and 25 to provide cool air to the rear row 5. Alternatively, the heater 20 may heat the cold air from cold air duct 16 a selected amount whereby the temperature of air supplied to the floor and panel outlets 24 and 25, respectively, can be controlled through a range of cold to warm as required or requested by passengers in the rear row 5 and/or additional rear zones (not shown).

Figure 1A:
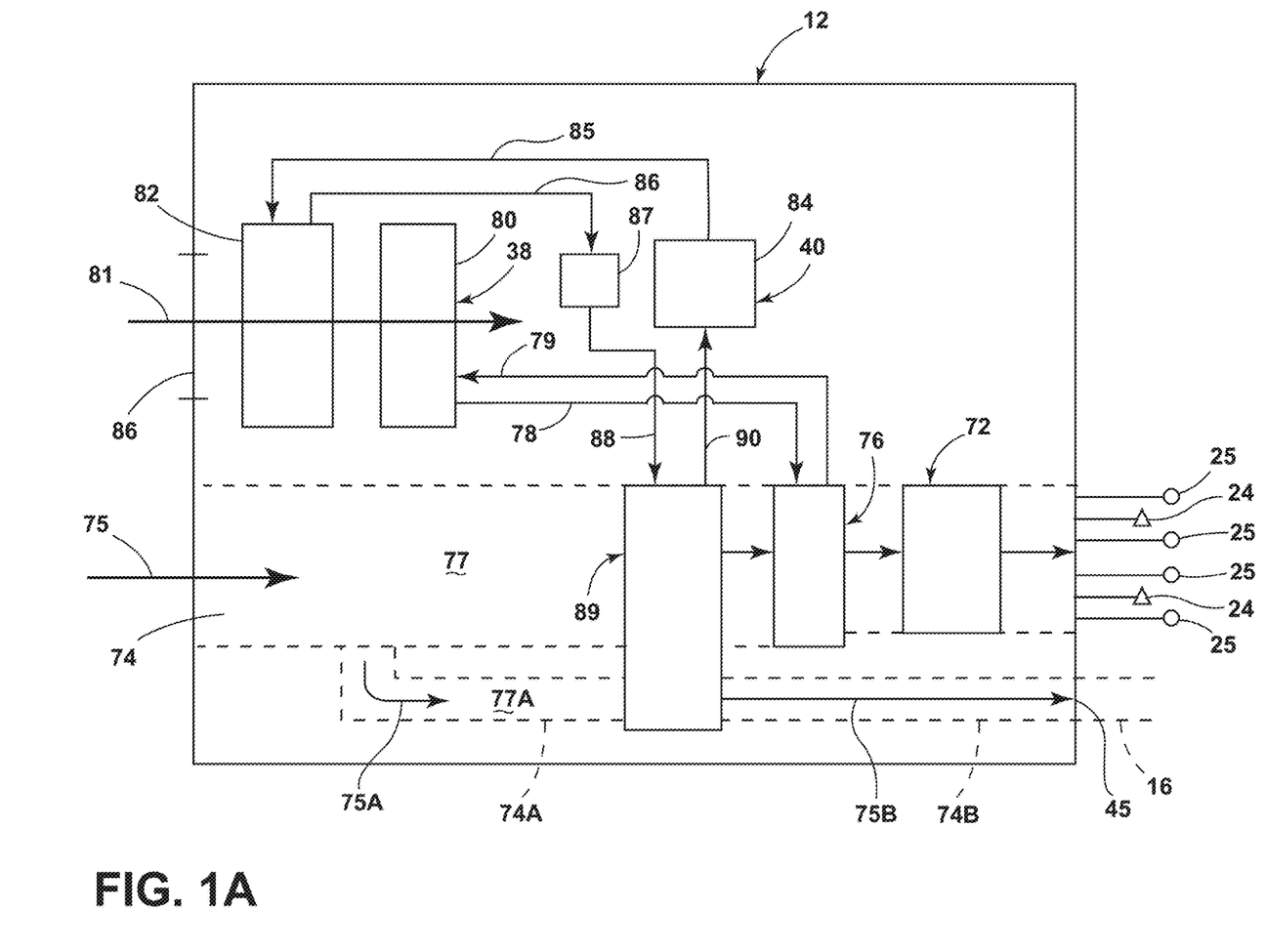
FIG. 1A is a schematic showing a front HVAC unit according to one aspect of the present disclosure.

With further reference to FIG. 1A, the front HVAC unit 12 may include an air inlet 74 that intakes ambient air 75. The heating unit 38 may comprise a fluid to air heat exchanger 76 that is disposed in air passageway 77, whereby air 75 entering air inlet 74 flows through the fluid air heat exchanger 76. The heat exchanger 76 may be fluidly connected to a source 80 of heated liquid. In the illustrated example, the heat source 80 comprises a radiator of an internal combustion engine that is positioned adjacent to a condenser 82 of cooling system 40 such that air 81 entering an inlet 83 flows through condenser 82 and radiator 80 to thereby heat liquid (e.g., coolant) flowing through lines 78 and 79. However, heat source 80 may comprise an electrically-powered heater that heats liquid (e.g., coolant) supplied to heat exchanger 76. Alternatively, heat exchanger 76 may be electrically heated directly by an electric heating element that is thermally connected to heat exchanger 76 by a thermally conductive material (e.g., metal) such that liquid is not required to transfer heat from a remote source. It will be understood that the heat exchanger 76 could be configured to receive heat from multiple sources (e.g., direct electric heat and a remote liquid heat source 80).

Cooling system 40 includes a compressor 84 that compresses refrigerant that flows through line 85 to condenser 82. Refrigerant exiting condenser 82 flows through line 86 to an expansion valve 87, and through line 88 to an evaporator core 89. Refrigerant flows from evaporator core 89 through a line 90 to the compressor 84. Air 75 flowing through passage 77 flows through evaporator core 89 to thereby cool and dehumidify the air, and the air then flows through the heat exchanger 76. The flow of fluid through the lines 78 and 79 may be controlled by a valve (not shown) in a known manner to thereby selectively heat the air a desired amount. Alternatively, the HVAC unit 12 may be configured to mix air that has been heated by heat exchanger 76 with air that has been cooled by the evaporator core 89 utilizing blend doors (not shown). The conditioned air is then directed to selected outlets 24 and 25 by a mode door unit 72 as required for a particular application. The basic operation of the heater 38 and A/C unit 40 are known, such that a more detailed description is not believed to be required.

The front HVAC unit 12 may include an auxiliary air passage 77A that receives a portion 75A of the incoming air and diverts the air along a secondary passageway 74A. The air 75A flowing through secondary passageway 77A flows through the evaporator core 89 whereby the air 75A is cooled to provide cooled air 75B that flows through a downstream portion 74B of the auxiliary air passageway 74A. The cooled air 75B exits into cold air duct 16 at cold air outlet 45. In the illustrated example, the auxiliary air passageway 77A is not operably connected to the heat exchanger 76 of heating unit 38 such that the air flowing out of cold air outlet 45 cannot be heated. It will be understood that numerous ways to provide a cold air outlet 45 are possible, and the arrangement of FIG. 1A is merely an example of a possible configuration.

If vehicle 1 comprises an electrically-powered vehicle, the vehicle may include a floor structure 30 (FIG. 2) that supports batteries 32 below a floorboard 34. Floor structure 30 may include battery support structure 31 that may include a lower pan or cover 31A that extends below the batteries 32. Vehicle 1 may include a center console 36 that extends fore-aft in a central portion 28 of the vehicle 1. The auxiliary console HVAC system 14 may be disposed at least partially within the console 36 between left and right front seats 4A and 4B, respectively. Floorboard 34 may extend continuously across the vehicle 1, with left and right edge portions 34A and 34B, and a central portion 34C disposed below the auxiliary console HVAC unit 14 and center console 36. Thus, the floorboard 34 may be configured to separate (isolate) the auxiliary console HVAC unit 14 from the batteries 32 positioned below the floorboard 34. Floorboard 34 may optionally include a raised center portion 34D (FIG. 3). If vehicle 1 is configured in this way, the console unit 14 may be positioned above the raised center floorboard portion 34D above batteries 32.

Figure 4:
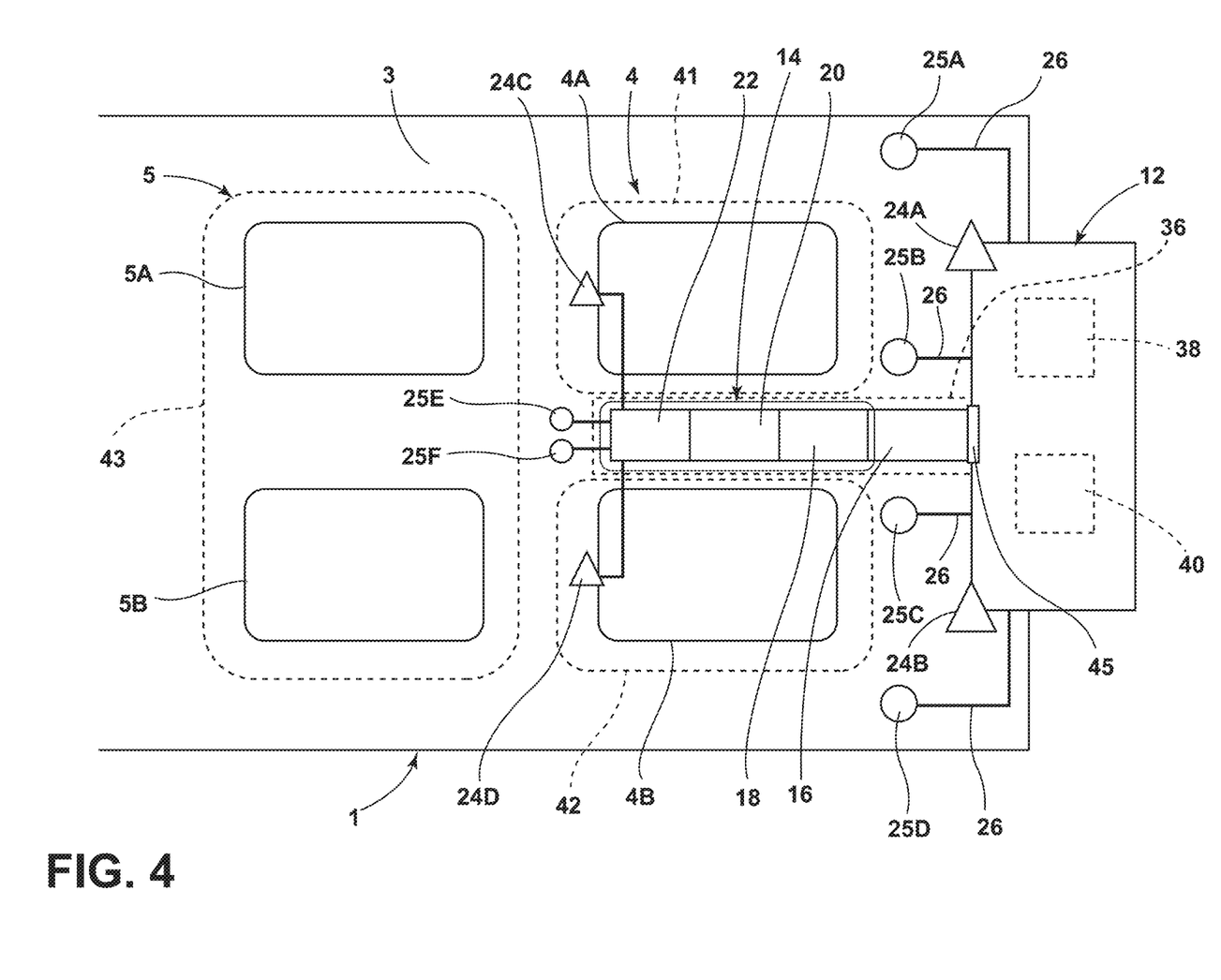
FIG. 4 is a schematic plan view of a motor vehicle having three climate zones.

With further reference to FIG. 4, the front HVAC unit 12 may be configured to supply conditioned air to individual floor outlets 24A-24B and individual panel outlets 25A-25D via ducts 26. As discussed in more detail below in connection with FIG. 4A, the front HVAC system 12 may include a heating unit 38 and a cooling (AC) unit 40 that supply conditioned air at a desired temperature to the front outlets 24A-24B, and 25A-25D. The left front seat 4A may define a first front zone 41, and the seat 4B may define a second front zone 42. The outlets 24A, 25A, and 25B supply conditioned air to the first front zone 41, and the outlets 24B, 25C, and 25D provide air to the second front zone 42. In general, the temperature of the air supplied to the first and second front zones 41 and 42 can be individually controlled. For example, the front HVAC unit 12 may include blend doors (not shown) to provide a mixture of cold and warm air from heating unit 38 and AC unit 40 to the front outlets 24 and 25 in a manner that is generally known. Alternatively, an amount of heat supplied by heating unit 38 to air that has been cooled by AC unit 40 may be adjusted to control the temperature of air supplied to front outlets 24 and 25.

Cold air outlet 45 of front HVAC unit 12 is fluidly connected to cold air duct 16. The cold air outlet 45 preferably provides only cold air from AC unit 40 to the cold air duct 16. An optional blower motor unit 18 is fluidly connected to the cold air duct 16 to cause the cold air from front HVAC unit 12 to flow into heater 20. The heater 20 of FIG. 4 comprises a single zone heater core. Thus, substantially all of the air entering heater 20 is heated to the same temperature (if heater 20 is actuated), and the heated (conditioned) air is then supplied to the mode door assembly 22 and distributed to floor outlets 24C and 24D and panel outlets 25E and 25F. The mode door assembly 22 is configured to distribute the flow of air to the floor outlets 24C and 24D and the panel outlets 25E and 25F. For example, the mode door assembly 22 may be adjusted by a user such that substantially all of the air from heater 20 flows through the floor outlets 24C and 24D, or the mode door may be adjusted to cause substantially all of the air to flow through the panel outlets 25A and 25F. The mode door assembly 22 may also be adjusted to distribute the air through the floor outlets 24C and 24D and simultaneously through the panel outlets 25E and 25F. Rear seats 5A and 5B may together define a third or rear zone 43. It will be understood that the first and second rear seats 5A and 5B may comprise portions of a single rear bench seat, or separate seating units.

Figure 5:
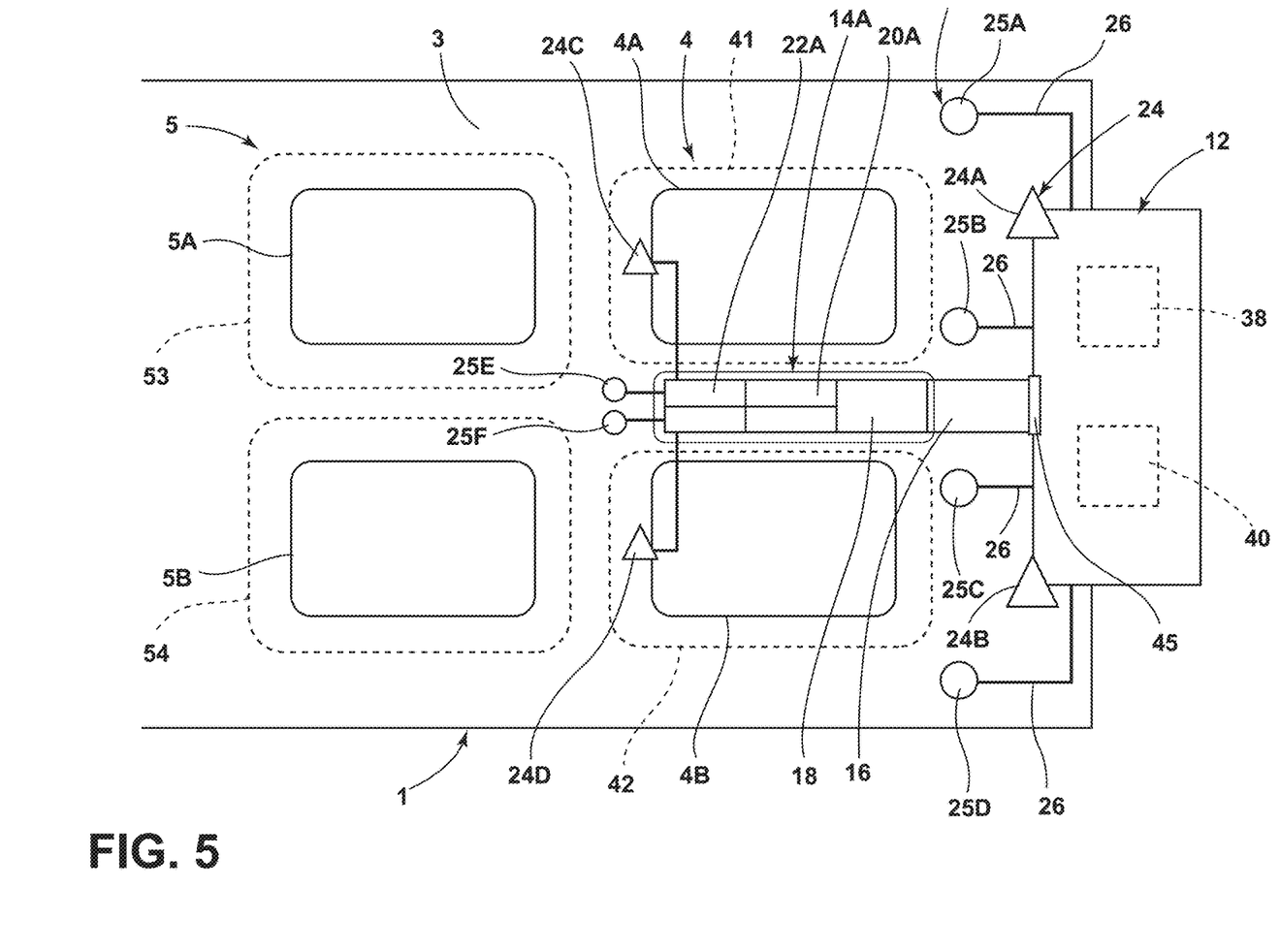
FIG. 5 is a schematic plan view of a motor vehicle having four climate zones.

With further reference to FIG. 5, vehicle 1 may alternatively be configured with third and fourth zones 53 and 54, respectively, corresponding to the first and second rear seats or seating areas 5A, 5B, respectively. The HVAC system 14A of FIG. 5 is substantially similar to the system 14 of FIG. 4 except that the system 14A includes a dual zone heater 20A and a dual mode door unit 22A. As discussed in more detail below, the dual zone heater 20A is configured to independently heat air supplied to third and fourth zones 53 and 54, and the mode door unit 22A is configured to provide for independent control of the air in third and fourth zones 53 and 54. Thus, the system 14A permits the temperature of third zone 53 to be controlled independently of fourth zone 54, and the flow of air to the floor and panel outlets 24C, 24D, 25E, and 25F can also be independently controlled. It will be understood that the temperature control for the first and second zones 41 and 42 of FIG. 5 is controlled in substantially the same manner as the first and second zones 41 and 42 of FIG. 4.

Figure 6:
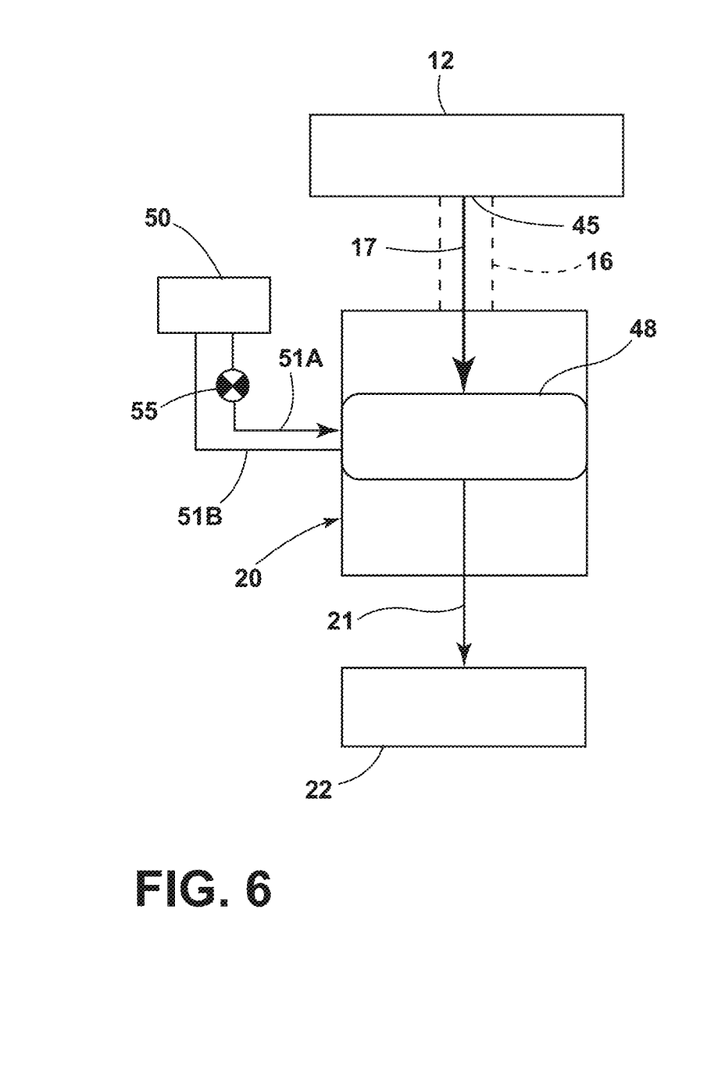
FIG. 6 is a schematic view of a single zone liquid-to-air heater core.

With further reference to FIG. 6, a single zone heater 20 may include a liquid-to-air heat exchanger 48 that is connected to a source 50 of heated liquid by lines 51A and 51B. Source 50 may comprise an electric heater that heats liquid (e.g., coolant), or source 50 may comprise an internal combustion engine (e.g., a conventional radiator) that heats liquid coolant. If vehicle 1 comprises an electrically-powered vehicle, the source 50 may comprise a high voltage PTC heater that is located in the powertrain compartment 7 and the lines 51A and 51B may be routed inside console 36 (see, e.g., FIG. 2). Similarly, if engine 6 comprises an internal combustion engine, the lines 51A and 51B may also be located in center console 36. Cold air 17 from outlet 45 of front HVAC unit 12 is heated as it flows through the heat exchanger 48, and conditioned (heated) air 21 is supplied to the mode door assembly 22. The heater 20 may be deactivated such that cold air 17 flows through the heater 20 without being heated. Also, the amount of heat supplied to the cold air 17 may be adjusted to thereby control the temperature of the conditioned air 21 exiting the heater 20. In particular, the volume of hot coolant received by the heat exchanger 48 from line 51A can be controlled by a powered valve 55 or other suitable arrangement. Alternatively, the temperature of the coolant flowing through line 51A can be controlled. For example, if source 50 comprises an electric heater, the amount of electricity supplied to heater 20 can be controlled to thereby control the temperature of the coolant exiting source 50. It will be understood that both the volume and temperature of coolant supplied to line 51A may be varied to thereby control the temperature of the heated air 21 exiting the heater 20.

Figure 7:
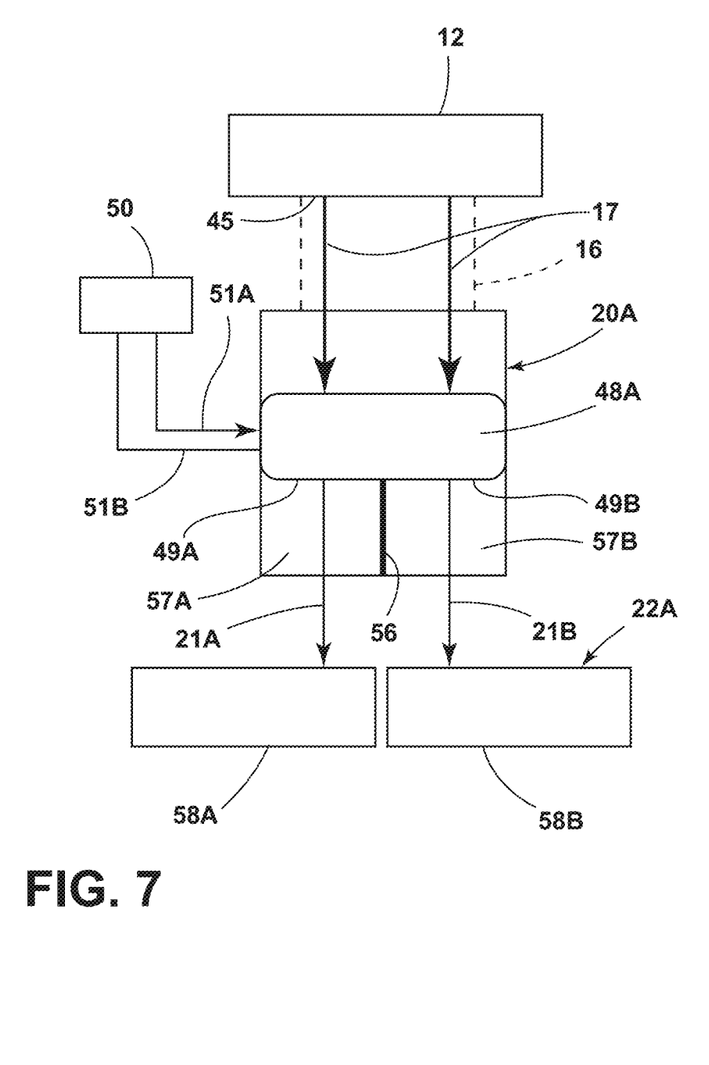
FIG. 7 is a schematic view of a dual zone liquid-to-air heater core.

With further reference to FIG. 7, a dual zone heater core 20A includes a dual zone liquid-to-air heat exchanger 48A having second heater cores 49A and 49B that are separately controlled to thereby heat air exiting the heat exchanger 48A independently. Specifically, the dual zone heater 20A receives cold air 17 in cold air duct 16, and includes first and second outlets 57A and 57B that are separated by a divider 56, and the conditioned (heated) air 21A and 21B exiting the first and second heater core sections 49A and 49B may be heated to different temperatures. Thus, separate streams 21A and 21B are supplied to first and second portions 58A and 58B of dual mode door assembly 22A. As discussed above in connection with FIG. 5, the dual zone mode door unit 22A is configured to separately control the flow of air to the outlets 24 and 25 of third and fourth zones 53 and 54.

Figure 8:
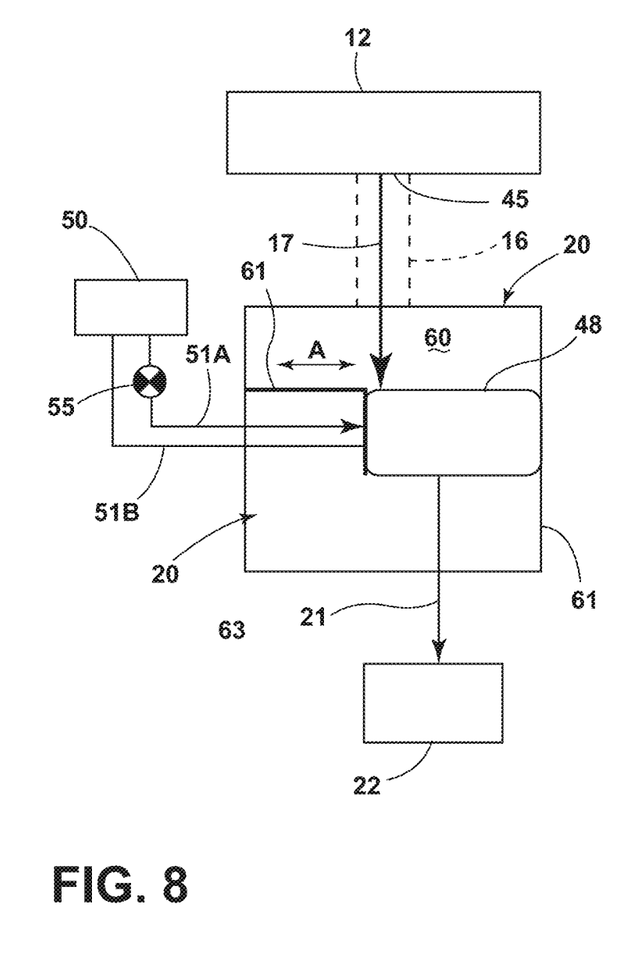
FIG. 8 is a schematic view of a single zone heater having a blend door.

With further reference to FIG. 8, a single zone heater 20 according to another aspect of the present disclosure includes a single zone heat exchanger 48 that may operate in substantially the same manner as the heater core 48 discussed above in connection with FIG. 6. The heater 20 receives cold air 17 from cold air outlet 45 through cold air duct 16, and the cold air enters an interior space 60 of housing 61 of heater 20. The air flow through the interior space 60 is controlled by a blend door 62 that can be shifted as shown by the arrow "A" to selectively divert the air through a bypass 63 or through heater core 48. In general, the position of the blend door 62 can be adjusted to cause all of the cold air 17 to flow through bypass 63. Alternatively, the blend door 62 can be positioned to completely block the bypass 63, thereby causing all of the cold air 17 to flow through the heater core 48 to heat the air. The blend door 62 may also be configured to allow some of the air to flow through heater core 48 and through bypass 63 to thereby partially heat the cold air 17. Blend door 62 may be operably connected to a powered actuator (not shown) in a known manner. In FIG. 8, blend door 62 is shown as being a sliding blend door 62 that translates in a linear manner. However, blend door 62 may comprise a rotating or pivoting blend door of a known type. Heated air 21 exiting the heater 20 is supplied to mode door assembly 22 in a manner that is substantially similar to the arrangement discussed above in connection with FIG. 6.

Figure 9:
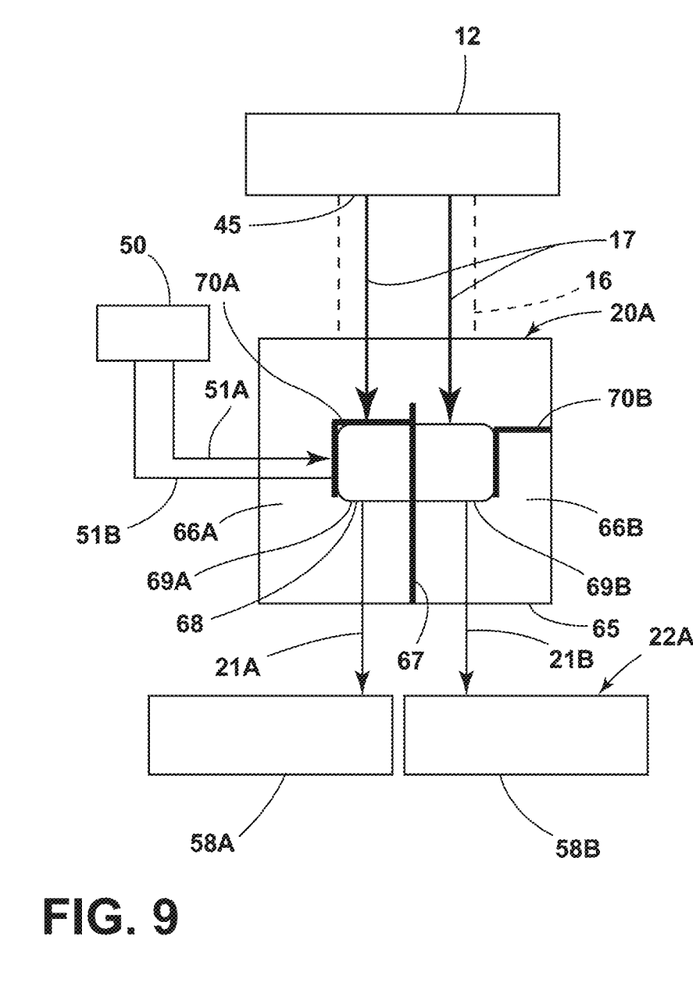
FIG. 9 is a schematic view of a dual zone heater having two blend doors.

With further reference to FIG. 9, a dual zone heater 20A according to another aspect of the present disclosure includes a housing 65 having bypass areas 66A and 66B with a divider 67 disposed between the bypass areas 66A and 66B. A dual zone heater core 68 includes first and second portions 69A and 69B that may be independently controlled in a manner that is substantially similar to the arrangement of FIG. 7 discussed above. The blend doors 70A and 70B selectively control the flow of air through the heater core sections 69A and 69B and through the bypass areas 66A and 66B to thereby control the temperature of conditioned air 21A and 21B exiting the dual zone heater 20A. The heated air 21A and 21B is supplied to mode door assembly 22A in a manner substantially similar to the arrangement discussed above in connection with FIG. 7.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. An electrically-powered vehicle having a passenger compartment and a front row of seats including left and right front seats defining first and second front zones of the passenger compartment, a second row of seats behind the left and right front seats defining at least one rear zone of the passenger compartment, a center console extending in a fore-aft direction between the left and right front seats, and a high voltage traction battery disposed below at least a portion of the center console, the electrically-powered vehicle further including a multi-zone climate control system comprising:
a front HVAC unit mounted in a forward portion of the electrically-powered vehicle forward of the left and right front seats, wherein the front HVAC unit includes a first air passage and a heat exchanger, wherein the heat exchanger is adapted to selectively heat air flowing through the first air passage, the front HVAC unit further including an evaporator that is adapted to selectively cool air flowing through the first air passage and through an auxiliary air passage of the front HVAC unit, wherein air flowing through the auxiliary air passage does not flow through the heat exchanger such that air flowing through the auxiliary air passage cannot be heated by operation of air flowing through the heat exchanger, the front HVAC unit including left and right front air outlets that are fluidly connected to the first air passage to provide heated and cooled air having non-equal first and second temperatures to the first and second front zones, respectively, and wherein the auxiliary air passage of the front HVAC unit is fluidly connected to a cold air outlet such that the front HVAC unit is incapable of providing air that has been heated by the heat exchanger to the cold air outlet;
a powered blower fluidly connected to the cold air outlet and positioned in the center console behind the front HVAC unit; and
a heater core fluidly connected to the powered blower whereby cold air from the cold air outlet of the front HVAC unit passes through the powered blower and enters the heater core, the heater core including a liquid-to-air heat exchanger that is fluidly connected to a source of heated liquid to selectively heat cold air entering the heater core, and wherein the heater core includes a heat control system that is configured to control a temperature of air exiting the heater core, the heat control system comprising at least one of: 1) a liquid-based heat control that is configured to adjust at least one of a temperature and a volume flow rate of heated liquid flowing through the liquid-to-air heat exchanger, and 2) an air blender having a blend door that is configured to selectively mix cold air from the front HVAC unit with air that has been heated by the liquid-to-air heat exchanger to control the temperature of air exiting the heater core, the heater core further including at least one air outlet configured to supply heated air from the heater core to the at least one rear zone of the passenger compartment.

2. The electrically-powered vehicle of claim 1, wherein: the multi-zone climate control system includes at least one mode door operably connected to the heater core to control flow of air from the at least one air outlet to at least one panel outlet of the at least one rear zone and at least one floor outlet of the at least one rear zone.

3. The electrically-powered vehicle of claim 1, wherein: the heater core is positioned in the center console rearward of the powered blower.

4. The electrically-powered vehicle of claim 3, wherein: the electrically-powered vehicle includes a powertrain compartment in front of the passenger compartment; and including:
an electrically-powered Positive Thermal Coefficient (PTC) heater disposed in the powertrain compartment, wherein the PTC heater is configured to heat liquid; and
at least one fluid line fluidly connecting the PTC heater to the liquid-to-air heat exchanger of the heater core whereby heated liquid from the PTC heater is supplied to the liquid-to-air heat exchanger of the heater core.

5. The electrically-powered vehicle of claim 4, wherein: the flow rate of liquid through the liquid-to-air heat exchanger is adjustable to thereby adjust a temperature of air exiting the heater core.

6. The electrically-powered vehicle of claim 4, wherein: a temperature of liquid entering the liquid-to-air heat exchanger can be adjusted to thereby adjust a temperature of air exiting the heater core.

7. The electrically-powered vehicle of claim 1, wherein: the heater core comprises a dual zone heater core having first and second liquid-to-air heat exchangers and corresponding first and second air outlets configured to supply heated air to third and fourth rear zones of the passenger compartment.

8. The electrically-powered vehicle of claim 7, wherein: flow rates of heated liquid flowing through the first and second liquid-to-air heat exchangers can be independently adjusted to independently control temperatures of heated air exiting the first and second air outlets.

9. The electrically-powered vehicle of claim 7, including: a dual blend door unit having first and second independently movable blend doors that are configured to mix cold air entering the dual zone heater core with heated air from the first and second air outlets to thereby independently control temperatures of air supplied to the third and fourth rear zones.

10. The electrically-powered vehicle of claim 1, wherein: the electrically-powered vehicle comprises a liquid-cooled internal combustion engine that heats liquid coolant; and including:
at least one liquid passageway fluidly interconnecting the liquid-cooled internal combustion engine with the liquid-to-air heat exchanger of the heater core.

11. The electrically-powered vehicle of claim 1, wherein: the front HVAC unit is incapable of supplying heated air to the cold air outlet.

12. The electrically-powered vehicle of claim 1, including:
a cold air duct fluidly interconnecting the cold air outlet of the front HVAC unit to the powered blower; and wherein the cold air duct, the powered blower, and the heater core are positioned in a row extending in a fore-aft direction in the center console.

13. The electrically-powered vehicle of claim 1, including:
   left and right footwells in front of the left and right front seats, respectively, and a panel disposed in front of the front row of seats above the left and right footwells; and wherein:
   the left and right front air outlets including left and right panel outlets in the panel and left and right floor outlets disposed in the left and right footwells, respectively; and
   the front HVAC unit is configured to supply heated and cooled air to the left and right panel outlets and the left and right floor outlets.

14. The electrically-powered vehicle of claim 13, wherein:
   the electrically-powered vehicle includes a powertrain compartment in front of the passenger compartment and a floorboard disposed above the high voltage traction battery; and
   the center console extends between the left and right footwells and between the left and right front seats, wherein the floorboard extends under the center console, the center console forming an elongated HVAC passageway directly above a central portion of the floorboard, wherein the cold air outlet of the front HVAC unit is disposed at a forward end of the HVAC passageway, the cold air outlet of the front HVAC unit being fluidly connected to the powered blower by a cold air duct disposed in the HVAC passageway, and wherein the powered blower and the heater core are disposed in the HVAC passageway.

15. A multi-zone climate control system for electrically-powered vehicles having a passenger compartment and a front row of seats including left and right front seats defining first and second front zones of the passenger compartment, a second row of seats behind the left and right front seats defining at least one rear zone of the passenger compartment, a center console extending in a fore-aft direction between the left and right front seats, and a high voltage traction battery disposed below at least a portion of the center console, the multi-zone climate control system comprising:
   a front HVAC unit configured to be mounted in a forward portion of the vehicle, wherein the front HVAC unit includes an auxiliary air passage, a first air passage, and a heat exchanger that is configured to selectively heat air flowing through the first air passage, the front HVAC unit further including an evaporator that is adapted to selectively cool air flowing through the first air passage and through the auxiliary air passage, wherein the front HVAC unit does not include an air mix door or an air mix space associated with the auxiliary air passage, such that air flowing through the auxiliary air passage cannot be mixed with air that has been heated by the heat exchanger, wherein air flowing through the first air passage is supplied to left and right front air outlets to provide heated and cooled air to first and second front zones, respectively, of the vehicle, and wherein the auxiliary air passage of the front HVAC unit is fluidly connected to a cold air outlet such that the front HVAC unit is incapable of providing air that has been heated by the heat exchanger to the cold air outlet;
   a powered blower fluidly connected to the cold air and positioned in the center console behind the front HVAC unit; and
   a heater core fluidly connected to the powered blower whereby cold air from the cold air outlet of the front HVAC unit passes through the powered blower and enters the heater core, the heater core including a liquid-to-air heat exchanger that is configured to be fluidly connected to a source of heated liquid to selectively heat cold air entering the heater core, and wherein the heater core includes a control system that is configured to control a temperature of air exiting the heater core, the heat control system comprising at least one of: 1) a liquid-based heat control that is configured to adjust at least one of a temperature and a volume flow rate of heated liquid flowing through the liquid-to-air heat exchanger, and 2) an air blender having a blend door that is configured to selectively mix cold air from the front HVAC unit with air that has been heated by the liquid-to-air heat exchanger to control the temperature of air exiting the heater core, the heater core further including at least one air outlet configured to supply heated air from the heater core to the at least one rear zone of the passenger compartment.

16. The multi-zone climate control system of claim 15, including:
   at least one mode door operably connected to the heater core to control flow of air from the at least one air outlet to at least one panel outlet of the at least one rear zone and at least one floor outlet of the at least one rear zone.

17. The multi-zone climate control system of claim 15, including:
   an electrically-powered heater that supplies heated coolant to the liquid-to-air heat exchanger; and including:
   a valve configured to control a flow rate of heated coolant from the electrically-powered heater to the liquid-to-air heat exchanger.

18. The multi-zone climate control system of claim 15, wherein:
   the liquid-to-air heat exchanger comprises a dual liquid-to-air heat exchanger having first and second liquid-to-air heat exchangers, each liquid-to-air heat exchanger having liquid inlets and outlets whereby flow rates of heated coolant to the first and second liquid-to-air heat exchangers can be separately controlled.

19. A method of controlling air temperature in multiple zones of a passenger compartment of an electrically-powered motor vehicle, the method comprising:
   providing an electrically-powered vehicle having a passenger compartment and a front row of seats including left and right front seats defining first and second front zones of the passenger compartment, a second row of seats behind the left and right front seats defining at least one rear zone of the passenger compartment, a center console extending in a fore-aft direction between the left and right front seats, and a high voltage traction battery disposed below at least a portion of the center console, the electrically-powered vehicle further including a multi-zone climate control system comprising:
   providing a front HVAC unit mounted in a forward portion of the electrically-powered vehicle forward of the left and right front seats, wherein the front HVAC unit includes a first air passage and a heat exchanger wherein the heat exchanger is adapted to selectively heat air flowing through the first air passage, the front HVAC unit further including an evaporator that is adapted to selectively cool air flowing through the first air passage and through an auxiliary air passage of the front HVAC unit, wherein air flowing through the auxiliary air passage does not flow through the heat exchanger such that air flowing through the auxiliary air passage cannot be heated by operation of air flowing through the heat exchanger, the front HVAC unit including left and right front air outlets that are fluidly connected to the first air passage to provide heated and cooled air having non-equal first and second temperatures to the first and second front zones, respectively, and wherein the auxiliary air passage of the front HVAC unit is fluidly connected to a cold air outlet such that the front HVAC unit is incapable of providing air that has been heated by the heat exchanger to the cold air outlet;

providing a powered blower fluidly connected to the cold air outlet and positioned in the center console behind the front HVAC unit; and providing a heater core that is fluidly connected to the powered blower whereby cold air from the cold air outlet of the front HVAC unit passes through the powered blower and enters the heater core, the heater core including a liquid-to-air heat exchanger that is fluidly connected to a source of heated liquid to selectively heat cold air entering the heater core, and wherein the heater core includes a heat control system that is configured to control a temperature of air exiting the heater core, the heat control system comprising at least one of: 1) a liquid-based heat control that is configured to adjust at least one of a temperature and a volume flow rate of heated liquid flowing through the liquid-to-air heat exchanger, and 2) an air blender having a blend door that is configured to selectively mix cold air from the front HVAC unit with air that has been heated by the liquid-to-air heat exchanger to control the temperature of air exiting the heater core, the heater core further including at least one air outlet configured to supply heated air from the heater core to the at least one rear zone of the passenger compartment;

utilizing the front HVAC unit to provide independently-controlled conditioned air to the first and second front zones of the passenger compartment;

causing cold air from the cold air outlet of the front HVAC unit to flow rearwardly through the center console of the electrically-powered motor vehicle to the heater core;

using the liquid-to-air heat exchanger of the heater core to heat the cold air from the front HVAC unit; and distributing air that has been heated by the liquid-to-air heat exchanger to a rear zone of the passenger compartment that is located behind the first and second front zones of the passenger compartment.

20. The method of claim 19, including:

causing cold air exiting the front HVAC unit to be distributed to the rear zone without further cooling of the cold air after the cold air has exited the front HVAC unit.

* * * * *